United States Patent
Lee et al.

(10) Patent No.: US 8,051,265 B2
(45) Date of Patent: Nov. 1, 2011

(54) APPARATUS FOR MANAGING MEMORY IN REAL-TIME EMBEDDED SYSTEM AND METHOD OF ALLOCATING, DEALLOCATING AND MANAGING MEMORY IN REAL-TIME EMBEDDED SYSTEM

(75) Inventors: Jae-don Lee, Paju-si (KR); Jeong-joon Yoo, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 683 days.

(21) Appl. No.: 12/153,526

(22) Filed: May 20, 2008

(65) Prior Publication Data

US 2009/0150633 A1    Jun. 11, 2009

(30) Foreign Application Priority Data

Dec. 11, 2007   (KR) .......................... 10-2007-0128557

(51) Int. Cl.
   *G06F 12/00* (2006.01)
(52) U.S. Cl. ................................. 711/165; 711/E12.006
(58) Field of Classification Search .................. None
   See application file for complete search history.

(56) References Cited

U.S. PATENT DOCUMENTS

| | | | | |
|---|---|---|---|---|
| 5,903,757 A * | 5/1999 | Gretz et al. | ................ | 717/127 |
| 6,611,858 B1 | 8/2003 | Aravamudan et al. | | |
| 7,409,522 B1 * | 8/2008 | Fair et al. | ................ | 711/170 |

FOREIGN PATENT DOCUMENTS

| | | |
|---|---|---|
| JP | 63-271646 | 11/1988 |
| JP | 4-281539 | 10/1992 |
| JP | 5-225039 | 9/1993 |
| JP | 2002-358492 | 12/2002 |
| KR | 10-2005-0017134 | 2/2005 |
| KR | 10-2006-0098639 | 9/2006 |

* cited by examiner

*Primary Examiner* — Reginald Bragdon
*Assistant Examiner* — Eric Loonan
(74) *Attorney, Agent, or Firm* — Staas & Halsey LLP (57) ABSTRACT

An apparatus for managing memory in a real-time embedded system and a method of allocating, deallocating and managing memory in a real-time embedded system. The apparatus includes a defragmentation unit performing a defragmentation task according to a predetermined priority to collect together memory fragments, and a memory manager allocating or deallocating a predetermined area of memory upon request of a task, and calculating a memory fragmentation rate of the memory to determine a priority of the defragmentation task. The method of managing memory in a real-time embedded system includes determining whether the conditions under which the memory is used vary, and if the condition vary, calculating a memory fragmentation rate of the memory to determine a priority of the defragmentation task according to the memory fragmentation rate.

14 Claims, 6 Drawing Sheets

PRIORITY LIST

| MEMORY FRAGMENTATION RATE | PRIORITY VALUE FOR DEFRAGMENTATION TASK |
|---|---|
| 1 | 0 |
| 1.5 | 1 |
| 2 | 4 |
| ⋮ | ⋮ |

APPARATUS FOR MANAGING MEMORY IN REAL-TIME EMBEDDED SYSTEM AND METHOD OF ALLOCATING, DEALLOCATING AND MANAGING MEMORY IN REAL-TIME EMBEDDED SYSTEM

CROSS-REFERENCE TO RELATED APPLICATIONS

This application claims priority from Korean Patent Application No. 10-2007-0128557, filed on Dec. 11, 2007, the disclosure of which is incorporated herein in its entirety by reference.

BACKGROUND

1. Field

One or more embodiments of the present invention relate to a method and apparatus for operating an embedded system and, more particularly, to an apparatus for managing memory in a real-time embedded system and a method of allocating, deallocating and managing memory in a real-time embedded system for operating the embedded system in real time.

2. Description of the Related Art

An embedded system is a special-purpose computer system designed to perform one or a few dedicated tasks with limited resources. In the case of a mobile phone as a typical example of the embedded system, the limited resources refer to the size of the mobile phone, the memory capacity and the battery capacity, and the dedicated task refers to call processing for communications.

Embedded systems need to be efficiently managed and operated due to their limited resources. Among these limited resources, memory is used in most tasks and therefore needs to be particularly efficiently managed.

Garbage collection is a form of automatic memory management in the embedded system. It refers to the detection and pruning of unused data structures. This helps to reduce the time needed to access data.

Garbage collection is generally performed when data is stored, deleted or updated in memory. However, if garbage collection is performed whenever data varies, a system can only be used after the data is reorganized. Therefore, garbage collection cannot be adapted to a real-time system which is required to respond quickly after data is created.

In order to solve the above-mentioned problem, one method has been proposed which uses a memory flag to perform garbage collection only when a system is in an idle mode. With this method users do not need to wait long since the data is reorganized in the idle mode when memory is not used. However, this method is not appropriate for memory-consuming tasks or multitasking systems requiring real-time processing.

SUMMARY

One or more embodiments of the present invention provide an apparatus for managing memory in a real-time embedded system and a method of allocating, deallocating and managing memory in a real-time embedded system, for operating the embedded system in real time.

Additional aspects and/or advantages will be set forth in part in the description which follows and, in part, will be apparent from the description, or may be learned by practice of the invention.

To achieve the above and/or other aspects and advantages, embodiments of the present invention include a memory management apparatus for a real-time embedded system, including a defragmentation unit performing a defragmentation task on a memory according to a set priority of the defragmentation task to collect memory fragments of the memory, and a memory manager allocating or deallocating a predetermined area of the memory upon request of a task, and calculating a memory fragmentation rate of the memory to set the priority of the defragmentation task.

To achieve the above and/or other aspects and advantages, embodiments of the present invention also include a method of managing memory using a defragmentation task in a real-time embedded system, including determining whether conditions under which the memory operates vary, and if the conditions vary, calculating a memory fragmentation rate of the memory to set a priority of the defragmentation task, to be performed on the memory, according to the memory fragmentation rate.

To achieve the above and/or other aspects and advantages, embodiments of the present invention also include a method of allocating memory in a real-time embedded system, including determining whether a task requests an allocation of a memory size of a memory larger than an allocable memory size of the memory, setting a priority of a defragmentation task to have a same priority as the task that requested the memory allocation if the requested memory size exceeds the allocable memory size, performing the defragmentation task on the memory according to the priority of the defragmentation task, and calculating a memory fragmentation rate of the memory to update the priority of the defragmentation task according to the memory fragmentation rate.

To achieve the above and/or other aspects and advantages, embodiments of the present invention also include a method of deallocating memory in a real-time embedded system, including deallocating a predetermined area of a memory upon request of a task, calculating a memory fragmentation rate of the memory to set a priority of a defragmentation task, to be performed on the memory, according to the memory fragmentation rate, comparing a previous priority of the defragmentation task, set prior to the deallocation of the memory, with a new priority of the defragmentation task, set according to the memory fragmentation rate after the deallocation of the memory, and updating the priority of the defragmentation task if the new priority of the defragmentation task is higher than the previous priority of the defragmentation task.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 1:
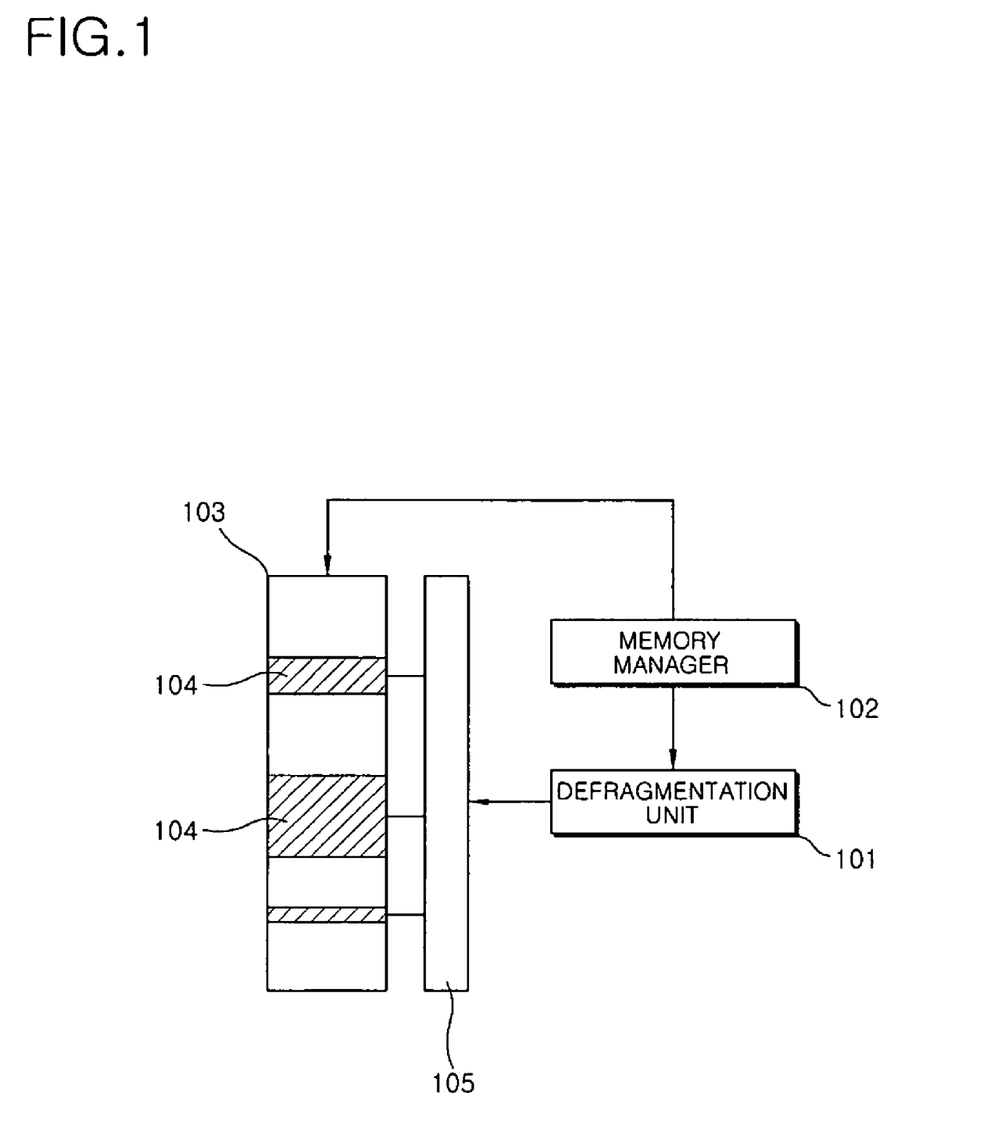
FIG. 1 is a block diagram of a memory management apparatus of a real-time embedded system, according to an embodiment of the present invention.

FIG. 1 is a block diagram of a memory management apparatus of a real-time embedded system, according to an embodiment of the present invention.

The memory management apparatus includes a defragmentation unit 101 and a memory manager 102.

The defragmentation unit 101 is configured to perform a defragmentation task according to a priority. The defragmentation task is a process that reduces the amount of fragmentation in a memory 103 to create larger regions of free space by collecting together physically non-contiguous memory fragments 104. The priority refers to the scheduling order of a plurality of tasks. For example, when the embedded system according to an embodiment of the present invention needs to process a first task with a third priority and a second task with a fourth priority, a scheduler (not shown) makes out a schedule to perform the first task with a higher priority prior to the second task. Therefore, the defragmentation task can be scheduled to be performed according to the priority. The priority is preferably controlled taking into account the condition of the memory, which will be described below in detail.

The defragmentation unit 101 can be configured to perform a defragmentation task using traditional techniques. For example, the memory fragments 104 may be collected together with reference to a fragment list 105 of the memory fragments 104. The memory manager 102 reassigns the priority whenever the defragmentation task is performed or the memory fragments 104 are collected together.

The memory manager 102 allocates or deallocates an area of the memory 103 upon request of a task. The task does not refer to the above-mentioned defragmentation task but to a typical one which requests allocation or deallocation of the memory 103.

The memory manager 102 also calculates a defragmentation rate of the memory 103 to determine the priority of the defragmentation task. The defragmentation rate of the memory 103 may be expressed as the ratio of the total size of the memory fragments 104 to the size of the largest memory fragment. Therefore, a larger number of memory fragments will cause a larger defragmentation rate. As described above, the priority of the defragmentation task depends on the defragmentation rate of the memory and may be set to be higher when the memory has a higher defragmentation rate.

Figure 2:
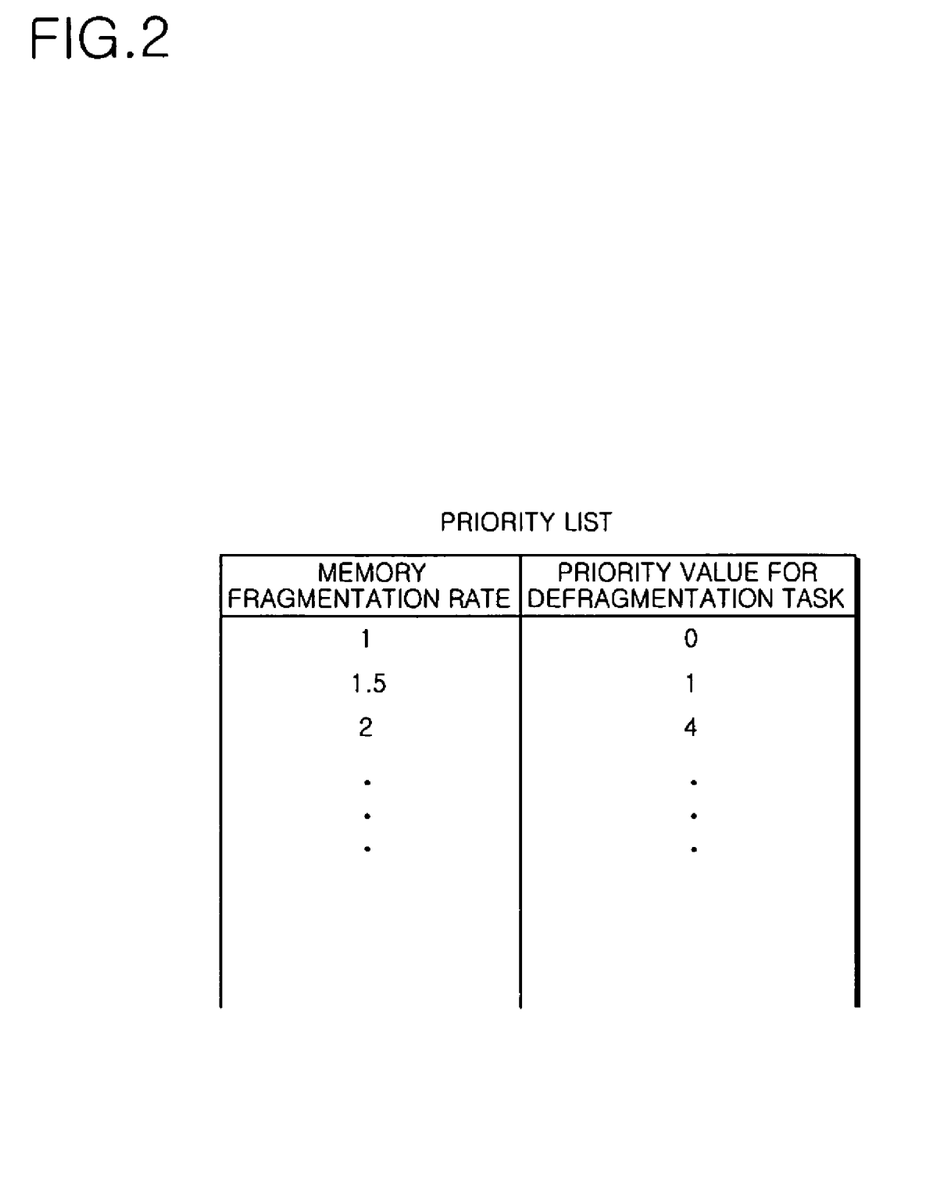
FIG. 2 illustrates a memory fragmentation rate and a priority, according to an embodiment of the present invention.

Referring to a priority list shown in FIG. 2, for example, the left column indicates a memory defragmentation rate, which is obtained by dividing the total size of memory fragments by the size of the largest memory fragment. Therefore, a larger number of memory fragments will result in a higher memory defragmentation rate. The right column indicates the priority of a defragmentation task, which corresponds to the memory defragmentation rate. A higher defragmentation rate may be set to correspond to a defragmentation task with a higher priority. In this case, a defragmentation task with high priority means that the defragmentation task is assigned a large priority value and is therefore performed prior to other defragmentation tasks with lower priority.

The largest memory fragment may represent a memory fragmentation rate. For example, if the total size of memory fragments is equal to the size of the largest memory fragment, it indicates that the memory is not fragmented. If the total size is equal to four times the size of the largest memory fragment, it indicates that the memory is divided into at least four fragments. The largest memory fragment indicates the size of memory currently available, and the total size of memory fragments indicates the size of memory available after the fragments are collected together.

In FIG. 2, the priority list is stored beforehand in the memory manager 102 or an extra storage unit (not shown). Therefore, the memory manager 102 can determine a memory fragmentation rate and determine the priority of a defragmentation task using the priority list.

The memory manager 102 determines whether or not the conditions under which the memory 103 are used vary. If the conditions vary, the memory manager 102 calculates the memory fragmentation rate and updates the priority of the defragmentation task. The usage conditions of the memory 103 may vary when the memory 103 is partly allocated or deallocated by a memory allocation/deallocation task. Additionally, the usage conditions of the memory 103 may vary when the defragmentation unit 101 performs a defragmentation task to collect together the memory fragments 104.

The memory manager 102 keeps monitoring the memory 103 and allocates or deallocates the memory 103 according to a predetermined task. When the usage conditions of the memory 103 vary, for example, due to a memory allocation/deallocation or defragmentation task, the memory manager 102 adjusts the priority of the defragmentation task accordingly, thereby ensuring real-time management of the embedded system.

If the defragmentation task needs not to be performed due to a very low fragmentation rate of the memory 103, the memory manager 102 lowers the priority of the defragmentation task to perform a general task prior to the defragmentation task. If the fragmentation rate of the memory 103 increases after the general task is performed, the memory manager 102 may increase the priority of the defragmentation task.

The memory manager 102 may have the following additional functions when memory allocation/deallocation is requested for a predetermined task.

Memory allocation will be first described with reference to FIG. 4.

If a task requests memory to be allocated and the size of the requested memory exceeds an allocable size of memory, the memory manager 102 changes a priority of a defragmentation task to be equal to a priority of the task requesting the memory allocation. Then, the task requesting the memory allocation changes into an idle state and the defragmentation unit 101 performs the defragmentation task. The defragmentation unit 101 preferably collects together memory fragments 104 one by one until the collected size of memory is equal to or more than the requested size of memory.

Memory deallocation will be described with reference to FIG. 6.

If memory is deallocated by request of a task, the memory manager 102 calculates a memory fragmentation rate and determines a priority of a defragmentation task. The memory manager 102 preferably compares a priority of a defragmentation task performed prior to the memory deallocation with a priority of a defragmentation task performed after the memory deallocation and grants a higher priority to the defragmentation task.

Figure 3:
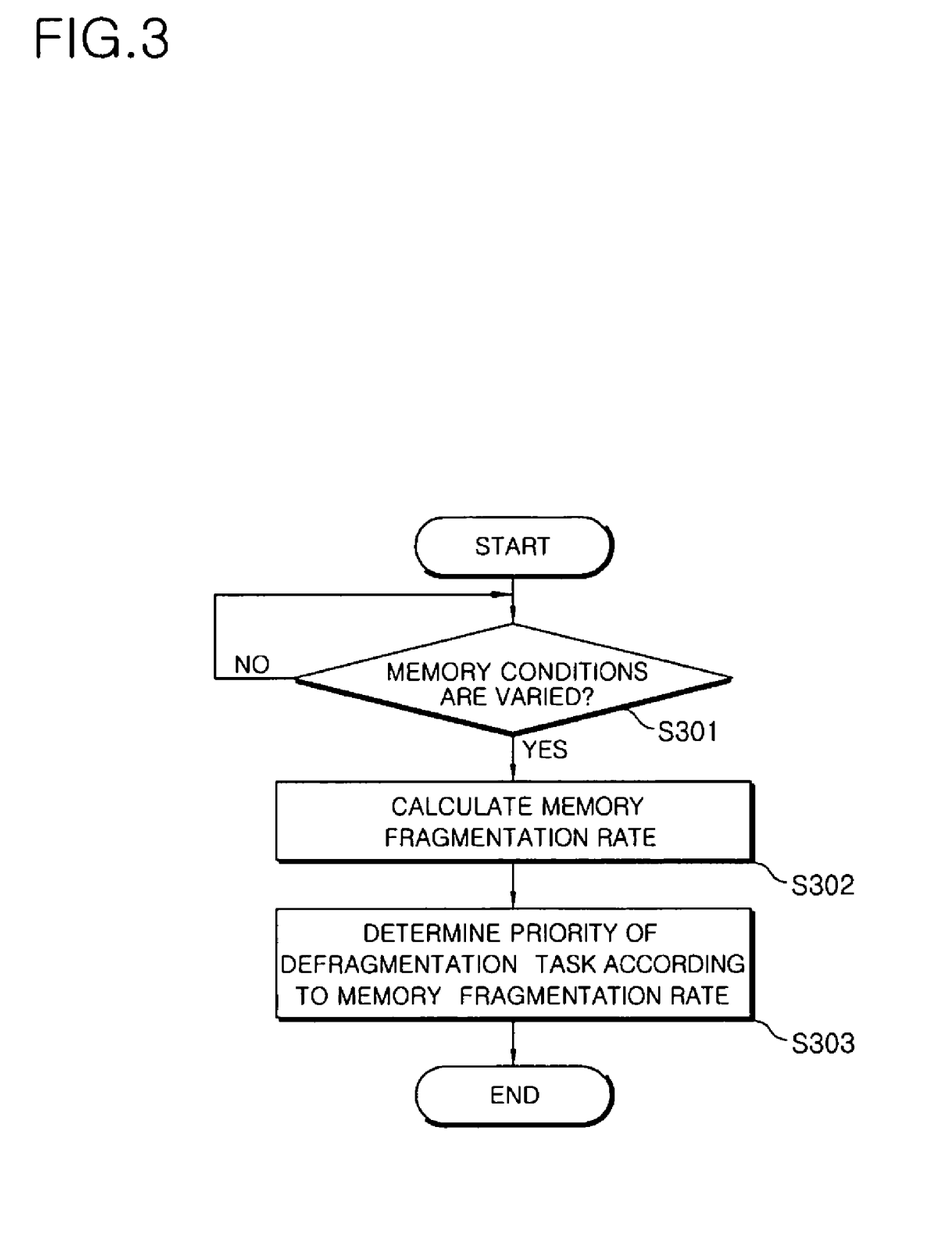
FIG. 3 is a flow chart of a memory management method of a real-time embedded system, according to an embodiment of the present invention.

FIG. 3 illustrates a method of managing memory using the memory management apparatus of the real-time embedded system, according to an embodiment of the present invention.

The memory manager 102 determines in operation S301 whether or not the usage conditions of the memory 103 vary. For example, the memory manager 102 determines whether the memory 103 has partly been allocated or deallocated due to a task requesting the memory allocation or deallocation, or whether the memory fragments 104 have been collected together due to a defragmentation task of the defragmentation unit 101.

If the usage conditions of the memory 103 vary, the memory manager 102 calculates a fragmentation rate of the memory 103 in operation S302. The memory fragmentation rate may be obtained by dividing the total size of memory fragments by the size of the largest memory fragment.

The memory manager 102 determines a priority of a defragmentation task according to the memory defragmentation rate in operation S303. The priority of the defragmentation task may be set higher as the memory fragmentation rate becomes higher. The priority list shown in FIG. 2 may be used.

Accordingly, since the defragmentation unit 101 performs a defragmentation task according to a priority which is determined by the memory manager 102 according to a fragmentation rate of the memory 103, general tasks requesting memory allocation and deallocation and the defragmentation task are scheduled according to the priority. Therefore, it is possible to efficiently manage memory and ensure a real-time system.

Figure 4:
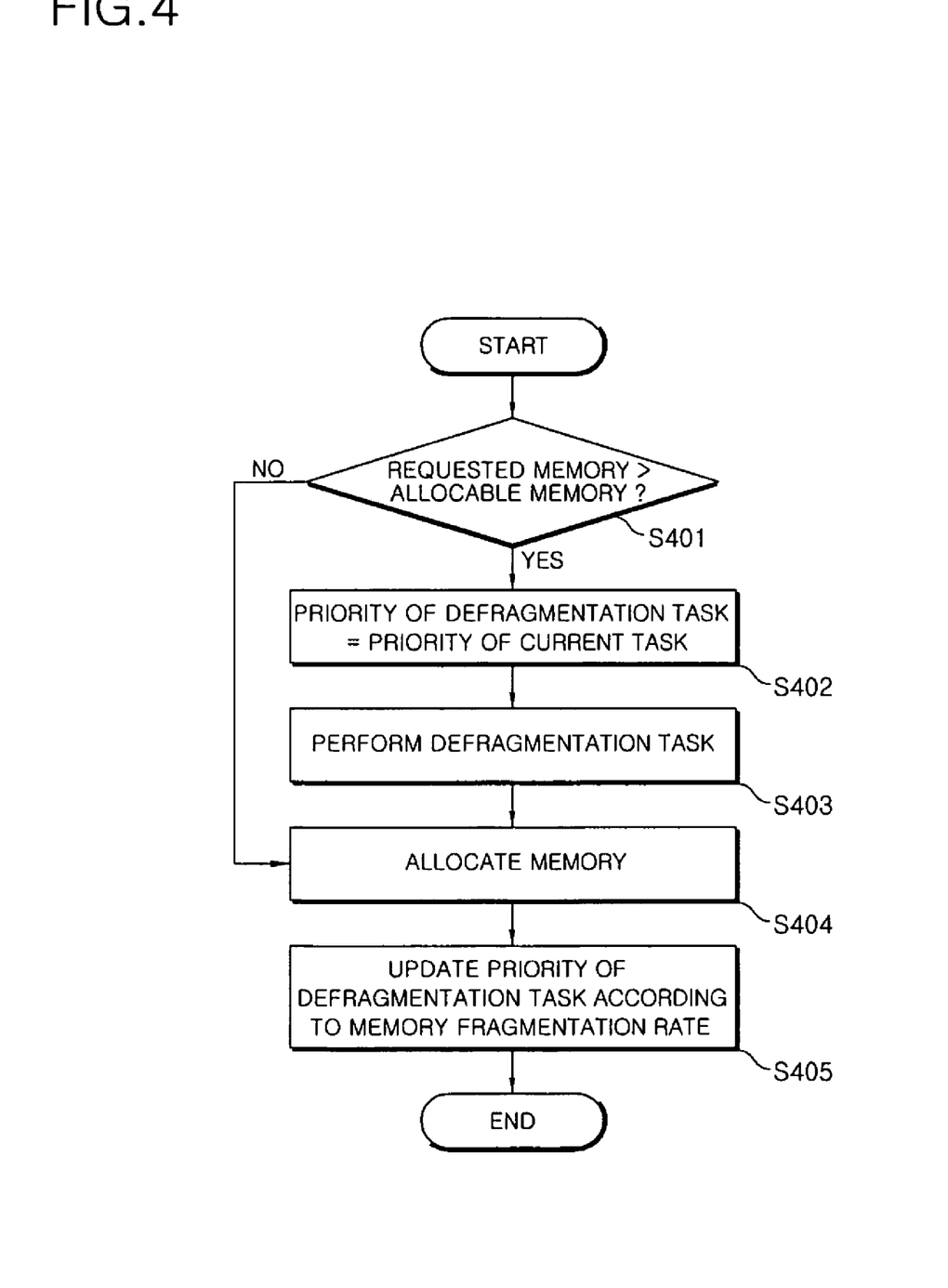
FIG. 4 is a flow chart of a memory allocation method of a real-time embedded system, according to an embodiment of the present invention.

FIG. 4 illustrates a method of allocating memory using the memory management apparatus of the real-time embedded system, according to an embodiment of the present invention.

If a task requests memory allocation, the memory manager 102 compares a requested size of memory with an allocable size of memory in operation S401. If the requested size of memory is smaller than or equal to the allocable size of memory, the memory manager 102 allocates a part of the memory 103 in operation S404, and calculates a memory fragmentation rate of the memory 103 and updates a priority of a defragmentation task in operation S405.

If the requested size of memory exceeds the allocable size of memory, however, a defragmentation task needs to be performed to collect together memory fragments. The memory manager 102 sets a priority of the defragmentation task to be equal to a priority of the task requesting the memory allocation in operation S402. An extra operation may be performed to store the requested size of memory in a predetermined variable.

Since the defragmentation task and the current task are adjusted to have the same priority, the defragmentation task is performed by the defragmentation unit 101 in operation S403 while the task requesting the memory allocation is being suspended.

Figure 5:
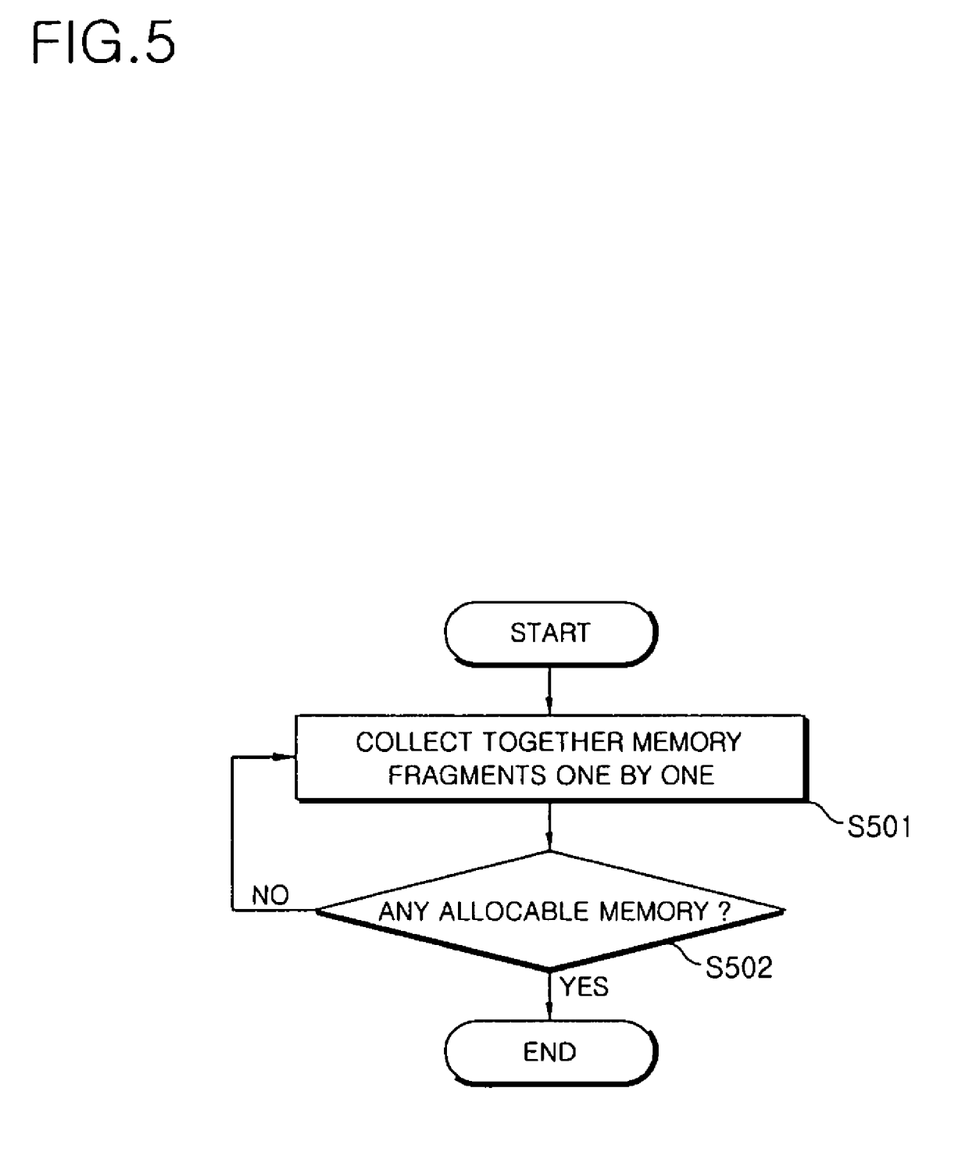
FIG. 5 is a flow chart of a method for performing a defragmentation task to make a memory allocation, according to an embodiment of the present invention.

The defragmentation task will be described in detail with reference to FIG. 5.

If the defragmentation task is scheduled, the defragmentation unit 101 collects memory fragments one by one in operation S501. The memory manager 102 determines whether or not memory can be allocated in operation S502. If the memory can be allocated, the defragmentation task ends. Otherwise, the defragmentation task is performed. That is, the defragmentation task is performed by collecting together memory fragments one by one until the size of collected memory is equal to or larger than a requested size of memory.

In another embodiment, when no memory allocation is requested, the defragmentation task may be performed by calculating a memory fragmentation rate whenever memory fragments are collected together one by one and determining a priority of the defragmentation task.

Referring to FIG. 4, after the defragmentation task is performed, the task requesting the memory allocation is scheduled to make memory allocation in operation S404.

Once the memory allocation is made, the memory manager 102 calculates a memory fragmentation rate and updates the priority of the defragmentation task according to the memory fragmentation rate in operation S405. The variable storing the requested memory size may be reset to 0.

The priority may be updated by creating one-to-one mapping between the priority and the memory fragmentation rate. If the requested memory size is smaller than the allocable memory size in operation S401, it proceeds to operation S404. In this case, the defragmentation task may be updated to have a lowest priority.

Figure 6:
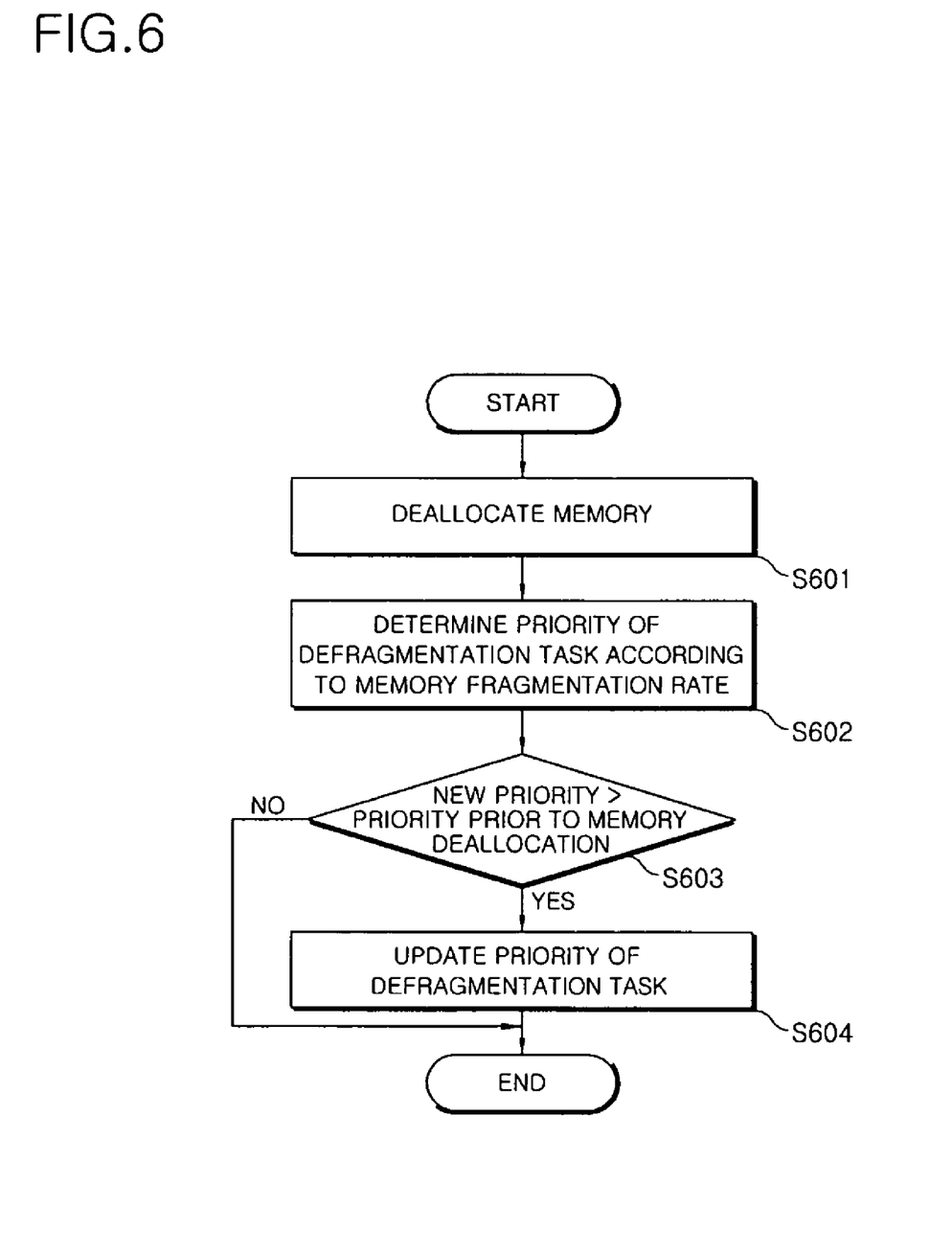
FIG. 6 is a flow chart of a memory deallocation method of a real-time embedded system, according to an embodiment of the present invention

FIG. 6 illustrates a method of deallocating memory using the memory management apparatus of the real-time embedded system, according to an embodiment of the present invention.

If a task requests memory to be deallocated, the memory manager 102 deallocates the memory in operation S601.

Once the memory deallocation is made, the memory manager 102 calculates a memory fragmentation rate of the memory and determines a priority of a defragmentation task according to the memory fragmentation rate in operation S602. The memory fragmentation rate is obtained by dividing the total size of memory fragments by the size of the largest memory fragment. The priority of the defragmentation task may be set higher as the memory fragmentation rate becomes higher. The priority list shown in FIG. 2 may be used.

The memory manager 102 compares the priority of the defragmentation task, which is determined in operation S602, with a priority of the defragmentation task, which is set prior to the memory deallocation, in operation S603.

If the priority of the defragmentation task determined in operation S602 is higher, the defragmentation task is granted the priority determined in operation S602, in operation S604. If lower, the defragmentation task has the priority which is set prior to the memory deallocation.

Accordingly, in a case of making a memory allocation, the defragmentation task is only performed until a requested memory size is obtained, and the priority of the defragmentation task is determined according to the memory fragmentation rate. Therefore, it is possible to reduce an unnecessary defragmentation task.

Additionally, in the case of making a memory deallocation, the defragmentation task is granted a priority according to a memory fragmentation rate after the memory deallocation.

Therefore, the priority of the defragmentation task can be appropriately adjusted according to the usage conditions of the memory.

As apparent from the above description, the priority of the defragmentation task is determined according to the memory condition, such as the memory fragmentation rate, and the defragmentation task is appropriately scheduled according to the priority. Therefore, it is possible to improve memory efficiency and operate the embedded system in real time.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or controlling carrier waves as well as elements of the Internet, for example. Thus, the medium may be such a defined and measurable structure carrying or controlling a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A memory management apparatus for a real-time embedded system, comprising:
    a defragmentation unit performing a defragmentation task on a memory according to a set priority of the defragmentation task to collect memory fragments of the memory; and
    a memory manager allocating or deallocating a predetermined area of the memory upon request of a task, and calculating a memory fragmentation rate of the memory to set the priority of the defragmentation task, wherein the memory fragmentation rate is expressed as a ratio of a total size of the memory fragments to a size of a largest memory fragment of the memory fragments.

2. The memory management apparatus of claim 1, wherein the priority of the defragmentation task is set higher as the memory fragmentation rate increases.

3. The memory management apparatus of claim 1, wherein, if the task requests a memory size larger than an allocable memory size of the memory, the memory manager changes the priority of the defragmentation task to have a same priority as the task that requested the memory allocation.

4. The memory management apparatus of claim 3, wherein the defragmentation unit performs the defragmentation task by collecting the memory fragments one by one until a collected memory size is equal to or larger than the memory size requested by the task.

5. The memory management apparatus of claim 1, wherein, if the predetermined area of the memory is deallocated by the request of the task, the memory manager compares a previous priority of the defragmentation task, set prior to the deallocation of the memory, with a new priority of the defragmentation task, set after the deallocation of the memory, to update the priority of the defragmentation task.

6. A method of managing memory using a defragmentation task in a real-time embedded system, comprising:
    determining whether conditions under which a memory operates vary; and
    calculating a memory fragmentation rate of the memory to set a priority of the defragmentation task, to be performed on the memory, according to the memory fragmentation rate if the conditions vary,
    wherein the memory fragmentation rate is expressed as a ratio of a total size of memory fragments of the memory to a size of a largest memory fragment of the memory fragments.

7. The method of claim 6, wherein the conditions of the memory vary when a predetermined area of the memory is allocated or deallocated or the defragmentation task is performed.

8. The method of claim 6, wherein the priority of the defragmentation task is set higher as the memory fragmentation rate increases.

9. A method of allocating memory in a real-time embedded system, comprising:
    determining whether a task requests an allocation of a memory size of a memory larger than an allocable memory size of the memory;
    setting a priority of a defragmentation task to have a same priority as the task that requested the memory allocation if the requested memory size exceeds the allocable memory size;
    performing the defragmentation task on the memory according to the priority of the defragmentation task; and
    calculating a memory fragmentation rate of the memory to update the priority of the defragmentation task according to the memory fragmentation rate.

10. The method of claim 9, wherein the defragmentation task is performed by collecting memory fragments of the memory one by one until a collected memory size of the collected memory fragments is equal to or larger than the memory size requested by the task.

11. The method of claim 9, wherein the memory fragmentation rate is expressed as a ratio of a total size of memory fragments of the memory to a size of a largest memory fragment of the memory fragments.

12. The method of claim 9, wherein the priority of the defragmentation task is set higher as the memory fragmentation rate increases.

13. A method of deallocating memory in a real-time embedded system, comprising:

deallocating a predetermined area of a memory upon request of a task;

calculating a memory fragmentation rate of the memory to set a priority of a defragmentation task, to be performed on the memory, according to the memory fragmentation rate;

comparing a previous priority of the defragmentation task, set prior to the deallocation of the memory, with a new priority of the defragmentation task, set according to the memory fragmentation rate after the deallocation of the memory; and updating the priority of the defragmentation task if the new priority of the defragmentation task is higher than the previous priority of the defragmentation task, wherein the memory fragmentation rate is expressed as a ratio of a total size of memory fragments of the memory to a size of a largest memory fragment of the memory fragments.

14. The method of claim 13, wherein the priority of the defragmentation task is set higher as the memory fragmentation rate increases.

* * * * *